United States Patent
Inoue (10) Patent No.: US 11,995,927 B2
(45) Date of Patent: May 28, 2024

(54) ON-VEHICLE RECORDING CONTROL APPARATUS, ON-VEHICLE RECORDING APPARATUS, ON-VEHICLE RECORDING CONTROL METHOD, AND NON-TRANSITORY COMPUTER-READABLE RECORDING MEDIUM

(71) Applicant: JVCKENWOOD Corporation, Yokohama (JP)

(72) Inventor: Masaaki Inoue, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 311 days.

(21) Appl. No.: 17/468,729

(22) Filed: Sep. 8, 2021

(65) Prior Publication Data

US 2021/0407227 A1    Dec. 30, 2021

Related U.S. Application Data

(63) Continuation of application No. PCT/JP2019/045471, filed on Nov. 20, 2019.

(30) Foreign Application Priority Data

Mar. 12, 2019    (JP) .................. 2019-044791

(51) Int. Cl.
*G07C 5/08*    (2006.01)
*G06F 3/16*    (2006.01)
(Continued)

(52) U.S. Cl.
CPC ............ *G07C 5/0866* (2013.01); *G06F 3/16* (2013.01); *H04M 3/42221* (2013.01); *H04N 5/772* (2013.01); *H04N 7/188* (2013.01)

(58) Field of Classification Search
CPC ...... G07C 5/08; G07C 5/0816; G07C 5/0833; G07C 5/0841; G07C 5/085; G07C 5/0858;
(Continued)

(56) References Cited

U.S. PATENT DOCUMENTS

| 2014/0049406 A1* | 2/2014 | Shin ................ G08G 1/0112 340/905 |
| 2014/0092249 A1* | 4/2014 | Freiburger ........ B60R 25/1004 348/148 |

(Continued)

FOREIGN PATENT DOCUMENTS

| JP | 2000-050251 | 2/2000 |
| JP | 2000050251 A * | 2/2000 |

(Continued)

OTHER PUBLICATIONS

Translation of JP-2000050251-A.*

(Continued)

*Primary Examiner* — Russell Frejd
*Assistant Examiner* — Sara J Lewandroski
(74) *Attorney, Agent, or Firm* — Amin, Turocy & Watson, LLP (57) ABSTRACT

An on-vehicle recording control apparatus includes a video data acquiring unit to acquire video data of surroundings of a vehicle; a voice data acquiring unit to acquire outside-vehicle-cabin voice data from an outside-vehicle-cabin (Continued)

voice collecting unit; an event detecting unit to detect an event for the vehicle; a stop detecting unit to detect a stop of the vehicle; a person detecting unit to detect a person in a vicinity of the vehicle from the video data; and a recording control unit to store, when the event is detected, first event recording data based on the video data and to store, when the person is detected after the stop of the vehicle is detected within a predetermined time period after the event is detected, second event recording data based on the video data and the outside-vehicle-cabin voice data until a predetermine time period has elapsed after the person is detected.

8 Claims, 7 Drawing Sheets

(51) Int. Cl.
*H04M 3/42* (2006.01)
*H04N 5/77* (2006.01)
*H04N 7/18* (2006.01)

(58) Field of Classification Search
CPC .. G07C 5/0866; G07C 5/0875; G07C 5/0883; G07C 5/0891; G06F 3/16; G06F 3/162; G06F 3/165; G06F 3/167; H04N 7/188; G05B 2219/36487; H04S 2400/15; H04M 11/005; H04M 3/42221
See application file for complete search history.

(56) References Cited

U.S. PATENT DOCUMENTS

| 2014/0324247 | A1* | 10/2014 | Jun | G07C 5/0866 |
| | | | | 701/1 |
| 2018/0211648 | A1 | 7/2018 | Nagai | |
| 2019/0318159 | A1* | 10/2019 | Blanc-Paques | G06Q 50/30 |
| 2020/0043260 | A1 | 2/2020 | Yamada et al. | |

FOREIGN PATENT DOCUMENTS

| JP | 2007-251556 | 9/2007 |
| JP | 2009-110224 | 5/2009 |
| JP | 2016-100672 | 5/2016 |
| JP | 2017-059086 | 3/2017 |
| JP | 2018-181043 | 11/2018 |
| WO | 2017/047287 | 3/2017 |

OTHER PUBLICATIONS

International Search Report and Written Opinion for International Application No. PCT/JP2019/045471 mailed on Jan. 28, 2020, 10 pages.
Extended European Search Report for European Patent Application No. 19918886.3 dated Mar. 18, 2022.

* cited by examiner

ON-VEHICLE RECORDING CONTROL APPARATUS, ON-VEHICLE RECORDING APPARATUS, ON-VEHICLE RECORDING CONTROL METHOD, AND NON-TRANSITORY COMPUTER-READABLE RECORDING MEDIUM

CROSS-REFERENCE TO RELATED APPLICATIONS

This application is a Continuation of PCT International Application No. PCT/JP2019/045471 filed on Nov. 20, 2019 which claims the benefit of priority from Japanese Patent Application No. 2019-044791 filed on Mar. 12, 2019, the entire contents of which are incorporated herein by reference.

BACKGROUND OF THE INVENTION

1. Field of the Invention

The present disclosure relates to an on-vehicle recording control apparatus, an on-vehicle recording apparatus, an on-vehicle recording control method, and a non-transitory computer-readable recording medium.

2. Description of the Related Art

There is a known technology for recording, when occurrence of an event related to a vehicle is detected, image capturing data in a time period before the occurrence of the event to the time point of the occurrence of the event (for example, see JP 2018-181043 A).

If a vehicle is stopped after the occurrence of the event, such as a collision, a passenger or the like of another vehicle who is a person concerned of the event sometimes gives an inappropriate response. Furthermore, the passenger or the like of the other vehicle who is a person concerned of the event also possibly provides explanations that are different between at the time of the occurrence of the event and at the later date.

A so-called dashboard camera is installed inside a vehicle cabin of a vehicle. It is possible to record a voice in addition to a video image in the image capturing data recorded at the time of the occurrence of the event; however, it is sometimes difficult to appropriately record a voice outside the vehicle cabin.

SUMMARY OF THE INVENTION

An on-vehicle recording control apparatus according to an embodiment includes: a video data acquiring unit configured to acquire video data captured by an image capturing unit that captures surroundings of a vehicle; a voice data acquiring unit configured to acquire outside-vehicle-cabin voice data from an outside-vehicle-cabin voice collecting unit that acquires a voice outside a vehicle cabin of the vehicle; an event detecting unit configured to detect an event for the vehicle; a stop detecting unit configured to detect a stop of the vehicle; a person detecting unit configured to detect a person in a vicinity of the vehicle from the video data acquired by the video data acquiring unit; and a recording control unit configured to store, when the event detecting unit detects the event, first event recording data based on the video data and to store, when the person detecting unit detects the person in the vicinity of the vehicle after the stop detecting unit detects the stop of the vehicle within a predetermined time period after the event detecting unit detects the event, second event recording data based on the video data and the outside-vehicle-cabin voice data until a predetermine time period has elapsed after the person is detected.

An on-vehicle recording apparatus according to an embodiment includes the above-described on-vehicle recording control apparatus, and at least one of the image capturing unit that captures the surroundings of the vehicle, the outside-vehicle-cabin voice collecting unit that acquires the voice outside of the vehicle cabin of the vehicle, and a recording unit that stores therein the first event recording data and the second event recording data.

An on-vehicle recording control method according to an embodiment includes: acquiring video data captured by an image capturing unit that captures surroundings of a vehicle; acquiring outside-vehicle-cabin voice data from an outside-vehicle-cabin voice collecting unit that acquires a voice outside a vehicle cabin of the vehicle; detecting an event for the vehicle; storing first event recording data based on the video data when the event is detected; detecting a stop of the vehicle; detecting a person in a vicinity of the vehicle from the video data acquired; and storing, when the person in the vicinity of the vehicle is detected after the stop of the vehicle is detected within a predetermined time period after the event is detected, second event recording data based on the video data and the outside-vehicle-cabin voice data until a predetermine time period has elapsed after the person is detected.

A non-transitory computer-readable recording medium according to an embodiment contains a computer program. The computer program causes a computer, which functions as an on-vehicle recording control apparatus, to execute: acquiring video data captured by an image capturing unit that captures surroundings of a vehicle; acquiring outside-vehicle-cabin voice data from an outside-vehicle-cabin voice collecting unit that acquires a voice outside a vehicle cabin of the vehicle; detecting an event for the vehicle; storing first event recording data based on the video data when the event is detected; detecting a stop of the vehicle; detecting a person in a vicinity of the vehicle from the video data acquired; and storing, when the person in the vicinity of the vehicle is detected after the stop of the vehicle is detected within a predetermined time period after the event is detected, second event recording data based on the video data and the outside-vehicle-cabin voice data until a predetermine time period has elapsed after the person is detected.

DETAILED DESCRIPTION

Preferred embodiments of an on-vehicle recording control apparatus, an on-vehicle recording apparatus, an on-vehicle recording control method, and a program according to the present embodiments will be explained in detail below with reference to the accompanying drawings. Furthermore, the present invention is not limited to the embodiments described below.

First Embodiment

Figure 1:
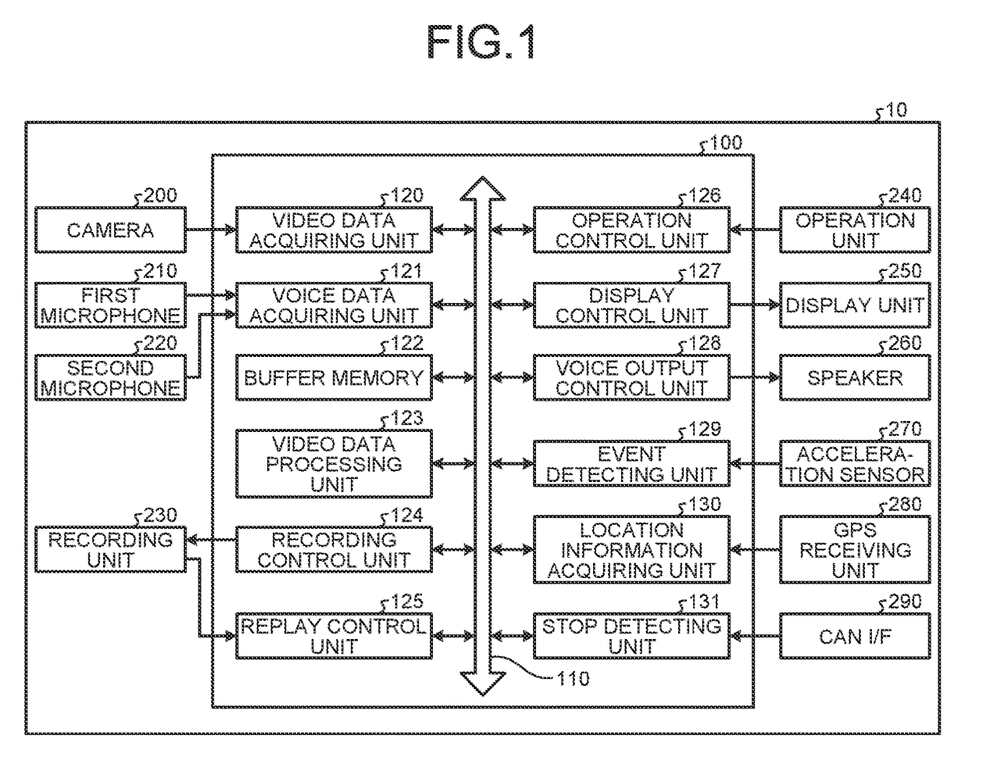
FIG. 1 is a block diagram illustrating a configuration example of an on-vehicle recording apparatus according to a first embodiment.

FIG. 1 is a block diagram illustrating a configuration example of an on-vehicle recording apparatus according to a first embodiment. An on-vehicle recording apparatus 10 stores first event recording data at the time of detection of an event, and stores second event recording data on the basis of video data and outside-vehicle-cabin voice data at the time of detection of a stop of a vehicle after detecting the event.

In a description below, the first event recording data and the second event recording data are referred to as event recording data when they need not be distinguished from each other.

The on-vehicle recording apparatus 10 is what is called a dashboard camera. The on-vehicle recording apparatus 10 may also be a portable type apparatus that can be used in a vehicle, in addition to a type that is mounted on a vehicle. The on-vehicle recording apparatus 10 includes a camera (image capturing unit) 200, a first microphone (inside-vehicle-cabin voice collecting unit) 210, a second microphone (outside-vehicle-cabin voice collecting unit) 220, a recording unit 230, an operation unit 240, a display unit 250, a speaker 260, an acceleration sensor 270, a Global Positioning System (GPS) receiving unit 280, a Controller Area Network (CAN) interface unit 290, and an on-vehicle recording control apparatus 100.

The camera 200 is a camera that captures the surroundings of the vehicle. In the embodiment, a description will be given under the assumption that the camera 200 is a camera capable of capturing a 360-degree view over the whole sky; however, the embodiment is not limited to this, the camera 200 may also be a single camera facing a single direction or a group of a plurality of cameras capturing different directions. The camera 200 is arranged at a position from which the camera 200 can capture the front portion in the vehicle cabin of a vehicle, for example. In the embodiment, the camera 200 always captures video images during a time period for which an accessory power supply of the vehicle is turned ON. The camera 200 starts to capture video images when the accessory power supply is turned OFF, in other words, when an event is detected during a time period for which the vehicle is parked. The camera 200 outputs the captured video data to a video data acquiring unit 120 included in the on-vehicle recording control apparatus 100. The video data is a moving image constituted of, for example, images at 30 frames per second.

The first microphone 210 acquires inside-vehicle-cabin voice data of a voice inside the vehicle cabin of the vehicle. For example, the first microphone 210 is arranged in a housing that constitutes the on-vehicle recording apparatus 10. Furthermore, the first microphone 210 may also be arranged in the vicinity of a display unit (not illustrated) included in a car navigation system. The first microphone 210 outputs the detected inside-vehicle-cabin voice data to a voice data acquiring unit 121.

The second microphone 220 acquires the outside-vehicle-cabin voice data of a voice outside the vehicle cabin of the vehicle. A plurality of the second microphones 220 may also be arranged. For example, the second microphone 220 may also be arranged in the vicinity of the door of the driver's seat, in the vicinity of the door mirror of the driver's seat, on the front bumper of the vehicle, or at the front grille of the vehicle. The second microphone 220 outputs the detected outside-vehicle-cabin voice data to the voice data acquiring unit 121.

In a description below, the inside-vehicle-cabin voice data and the outside-vehicle-cabin voice data are referred to as voice data when they need not be distinguished from each other.

The recording unit 230 is used to temporarily store therein data in the on-vehicle recording apparatus 10. The recording unit 230 is, for example, a semiconductor memory device, such as a random access memory (RAM) and a flash memory, or a recording unit, such as a memory card. Alternatively, the recording unit 230 may also be an external recording unit that is wirelessly connected via a communication device (not illustrated). The recording unit 230 records event recording data or loop recording data on the basis of a control signal that is output from a recording control unit 124 included in the on-vehicle recording control apparatus 100.

The operation unit 240 is able to receive various operations to be performed on the on-vehicle recording apparatus 10. For example, the operation unit 240 is able to receive an operation of manually storing the video data of the captured image in the recording unit 230. For example, the operation unit 240 is able to receive an operation of replaying the event recording data or the loop recording data recorded in the recording unit 230. For example, the operation unit 240 is able to receive an operation of erasing the event recording data recorded in the recording unit 230. For example, the operation unit 240 is able to receive an operation of ending the loop recording. The operation unit 240 outputs operation information to an operation control unit 126 included in the on-vehicle recording control apparatus 100.

The display unit 250 is, as an example, a display device unique to the on-vehicle recording apparatus 10, or a display device shared with another system including a navigation system. The display unit 250 is a display including, for example, a liquid crystal display (LCD) or an organic electro-luminescence (EL) display, or the like. The display unit 250 displays video images on the basis of a video image signal that is output from a display control unit 127 included in the on-vehicle recording control apparatus 100. The display unit 250 displays video images being captured by the camera 200 or video images having been recorded in the recording unit 230.

The speaker 260 is, as an example, a voice output control device unique to the on-vehicle recording apparatus 10, or a voice output control device shared with another system including a navigation system. The speaker 260 outputs a voice on the basis of a voice signal that is output from a voice output control unit 128 included in the on-vehicle recording control apparatus 100. The speaker 260 outputs a voice inside the vehicle cabin acquired by the first microphone 210 or a voice outside the vehicle cabin acquired by the second microphone 220.

The acceleration sensor 270 is a sensor that detects acceleration applied to the vehicle. The acceleration sensor 270 outputs a detection result to an event detecting unit 129 included in the on-vehicle recording control apparatus 100. The acceleration sensor 270 is a sensor that detects acceleration in, for example, the three axis directions. The three axis directions are a front-back direction, a left-right direction, and an up-down direction of the vehicle. It is possible to detect an impact applied to the vehicle based on acceleration in the three axis directions.

The GPS receiving unit 280 receives radio waves from GPS satellites (not illustrated). The GPS receiving unit 280 outputs signals of the received radio waves to a location information acquiring unit 130 included in the on-vehicle recording control apparatus 100.

The CAN interface unit 290 is an interface for acquiring various kinds of vehicle information via the CAN. The vehicle information includes information related to, for example, an operating condition of an engine, a running condition of the vehicle, or the like.

The on-vehicle recording control apparatus 100 is an arithmetic processing device (control device) constituted by, for example, a central processing unit (CPU), or the like. The on-vehicle recording control apparatus 100 loads a stored program into the memory and executes commands included in the program. An internal memory (not illustrated) is included in the on-vehicle recording control apparatus 100 and is used to temporarily store therein data in the on-vehicle recording control apparatus 100. The on-vehicle recording control apparatus 100 includes the video data acquiring unit 120, the voice data acquiring unit 121, a buffer memory 122, a video data processing unit 123, the recording control unit 124, a replay control unit 125, the operation control unit 126, the display control unit 127, the voice output control unit 128, the event detecting unit 129, the location information acquiring unit 130, and a stop detecting unit 131, which are connected by a bus 110.

The video data acquiring unit 120 acquires video data obtained by capturing the surroundings of the vehicle. More specifically, the video data acquiring unit 120 acquires the video data that is output from the camera 200, and then, outputs the video data to the buffer memory 122.

The voice data acquiring unit 121 acquires outside-vehicle-cabin voice data that is a voice outside the vehicle cabin of the vehicle. Furthermore, the voice data acquiring unit 121 may also acquire inside-vehicle-cabin voice data that is a voice inside the vehicle cabin of the vehicle. More specifically, the voice data acquiring unit 121 acquires the inside-vehicle-cabin voice data and the outside-vehicle-cabin voice data from the first microphone 210 and the second microphone 220, respectively, and outputs the acquired voice data to the buffer memory 122.

The buffer memory 122 is an internal memory included in the on-vehicle recording control apparatus 100 and is a memory that temporarily stores therein the video data for a predetermined period of time acquired by the video data acquiring unit 120, while updating the video data. The buffer memory 122 is a memory that temporarily stores therein the voice data for a predetermined period of time acquired by the voice data acquiring unit 121, while updating the voice data.

The video data processing unit 123 converts the video data that is temporarily stored in the buffer memory 122 to an arbitrary file format, such as an MP4 format, by encoding the video data using an arbitrary method, such as H.264 or Moving Picture Experts Group (MPEG-4). The video data processing unit 123 generates, from the video data that is temporarily stored in the buffer memory 122, video data as a file for a predetermined period of time. As a specific example, the video data processing unit 123 generates, in the recorded order, from the video data that is temporarily stored in the buffer memory 122, the video data corresponding to an amount equal to 60 seconds as a single file. The video data processing unit 123 outputs the generated video data to the recording control unit 124. Furthermore, the video data processing unit 123 outputs the generated video data to the display control unit 127. The period of time for which the video data is generated as a file is set to 60 seconds as an example; however, the example is not limited to this. The video data mentioned here may also be data that includes therein, in addition to the video images captured by the camera 200, voices collected by the first microphone 210.

The recording control unit 124 performs control of causing the recording unit 230 to record the video data that has been converted to the file format by the video data processing unit 123. In a period of time for which a loop recording process is performed when, for example, the accessory power supply of the vehicle is turned ON, the recording control unit 124 records, in the recording unit 230, the video data converted to the file format by the video data processing unit 123 as video data that can be overwritten. More specifically, in a period of time for which the loop recording process is performed, the recording control unit 124 continuously records the video data generated by the video data processing unit 123 into the recording unit 230, and, if the capacity of the recording unit 230 is full, the recording control unit 124 overwrites the oldest video data with new video data.

Furthermore, if the event detecting unit 129 detects an event, the recording control unit 124 stores, in the recording unit 230, the video data for the predetermined time period of the video data generated by the video data processing unit 123 as event recording data that is not able to be overwritten.

Furthermore, if the event detecting unit 129 detects an event, the recording control unit 124 stores the first event recording data based on the video data, and stores, if the stop detecting unit 131 detects a stop of the vehicle after the event detecting unit 129 detects the event, the second event recording data based on the video data and the outside-vehicle-cabin voice data. The recording control unit 124 records, as the second event recording data at the time of detection of the event, an inappropriate response given by a passenger of another vehicle who is a person concerned or an explanation provided from the person concerned who owns the other vehicle.

The recording control unit 124 stores the second event recording data based on the inside-vehicle-cabin voice data, in addition to the video data and the outside-vehicle-cabin voice data.

The replay control unit 125 replays the selected event recording data or the loop recording data. The replay control unit 125 performs control so as to replay, on the basis of a control signal of a selection operation and a replay operation that are output from the operation control unit 126, the event recording data or the loop recording data recorded in the recording unit 230.

Furthermore, the replay control unit 125 replays the first event recording data and the second event recording data that are the event recording data stored by the recording control unit 124. The replay control unit 125 replays the event recording data that includes the outside-vehicle-cabin voice data and the inside-vehicle-cabin voice data so as to be capable of selectively outputting one of the outside-vehicle-cabin voice data and the inside-vehicle-cabin voice data.

The operation control unit 126 acquires operation information on the operation received by the operation unit 240. For example, the operation control unit 126 acquires save operation information that indicates a manual save operation to be performed on the video data, selection operation information that indicates a selection operation to be performed on the video, replay operation information that indicates a replay operation to be performed on the video data, or erase operation information that indicates an erase operation to be performed on the video data, and then outputs a control signal. For example, the operation control unit 126 acquires end operation information that indicates the end of the loop recording, and then, outputs a control signal.

The display control unit 127 controls display of the video data in the display unit 250 on the basis of the control signal received from the replay control unit 125. The display control unit 127 outputs a video image signal for causing the display unit 250 to output the video data. More specifically, the display control unit 127 causes the display unit 250 to display the video data that is being captured by the camera 200, or to display the event recording data or the loop recording data that has been recorded in the recording unit 230 and that is replayed by the replay control unit 125.

The voice output control unit 128 outputs a voice signal for causing the voice data corresponding to the selected event recording data or the loop recording data to output from the speaker 260. The voice output control unit 128 outputs, on the basis of the control signal of the selection operation and the replay operation that are output from the operation control unit 126, the voice signal for causing the voice data corresponding to the event recording data or the loop recording data recorded in the recording unit 230 to output from the speaker 260.

The event detecting unit 129 detects an event for the vehicle. An arbitrary method may be used for the event detecting unit 129 to detect an event for the vehicle and, as an example, the event detecting unit 129 detects an event on the basis of a detection result obtained from the acceleration sensor 270. In this case, if acceleration greater than or equal to a threshold is detected from the acceleration detected by the acceleration sensor 270, the event detecting unit 129 detects this state as an event. The threshold used for event detection by the event detecting unit 129 is set to an acceleration by which an impact applied to the vehicle.

The location information acquiring unit 130 calculates, on the basis of the radio waves received by the GPS receiving unit 280, the current location information on the vehicle by using a known method. If the event detecting unit 129 detects an event, the location information calculated by the location information acquiring unit 130 is stored together with the event recording data.

The stop detecting unit 131 detects whether the vehicle is stopped on the basis of the vehicle information acquired from the CAN interface unit 290, various sensors that perform sensing the state of the vehicle, or the like. In the embodiment, the stop detecting unit 131 detects that the vehicle is stopped within a predetermined time period after the event detecting unit 129 detects the event. The state in which the vehicle is stopped indicates a state in which a vehicle speed is zero and the vehicle does not immediately starts travelling. Examples of the state include a state in which the vehicle speed is zero and power, such as an engine of the vehicle, is turned off, a state in which a gear is in parking mode, a state in which a parking brake is operating.

Figure 2:
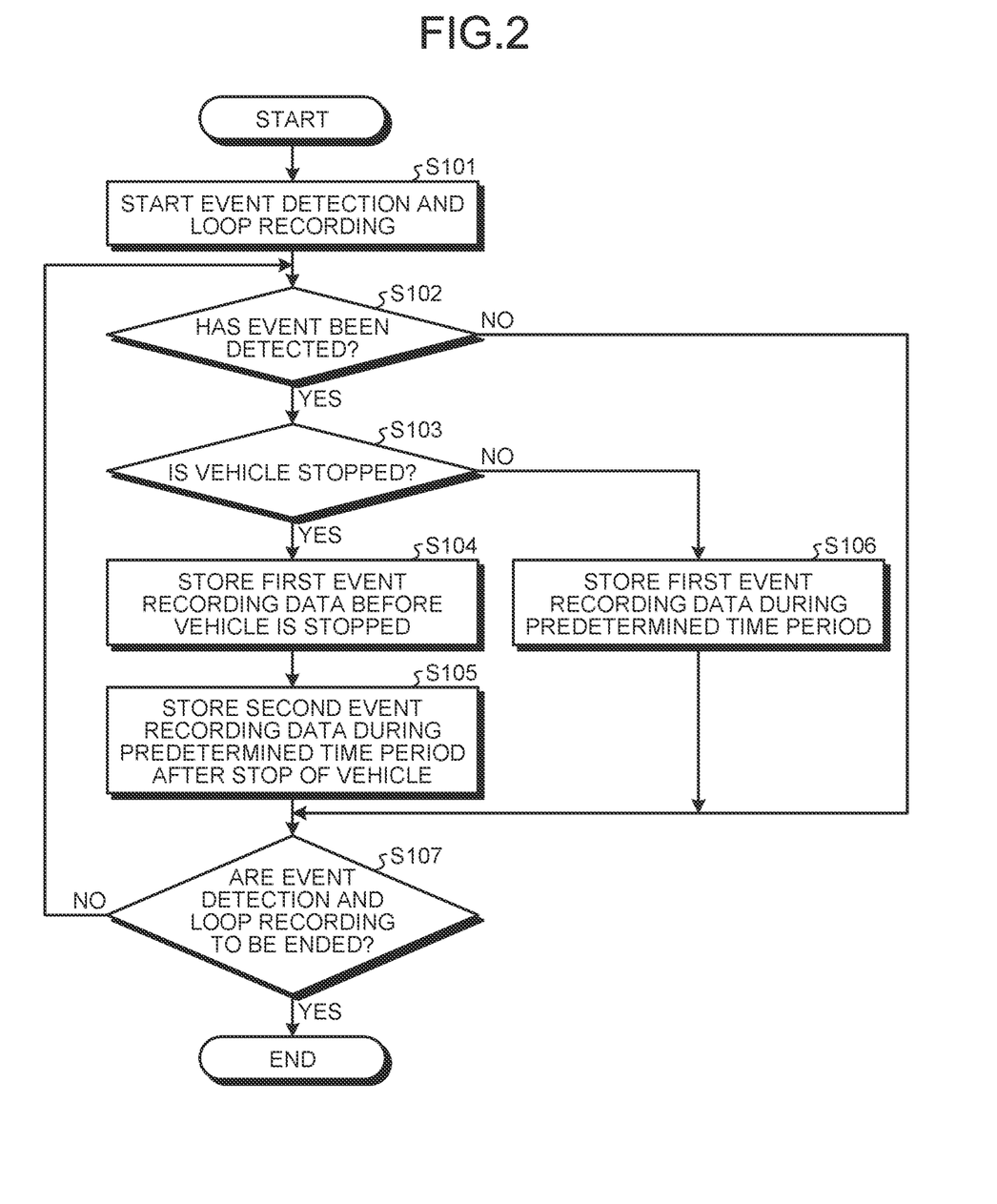
FIG. 2 is a flowchart illustrating the flow of a process performed in the on-vehicle recording control apparatus according to the first embodiment.

In the following, the flow of a process performed in the on-vehicle recording control apparatus 100 will be described with reference to FIG. 2. FIG. 2 is a flowchart illustrating the flow of a process performed in the on-vehicle recording control apparatus according to the first embodiment. Here, a case of performing a loop recording process will be described.

The on-vehicle recording control apparatus 100 starts an event detection and a loop recording (Step S101). More specifically, the on-vehicle recording control apparatus 100 detects, by using the event detecting unit 129, an event on the basis of the detection result obtained by the acceleration sensor 270. The on-vehicle recording control apparatus 100 generates, by using the video data processing unit 123 from the video data recorded in the buffer memory 122, loop recording video data for each video for a predetermined time period. The on-vehicle recording control apparatus 100 causes, by using the recording control unit 124, the recording unit 230 to record the loop recording video data. The on-vehicle recording control apparatus 100 proceeds to Step S102. The data that is subjected to loop recording may also be only the video data captured by the camera 200 or may also be, in addition to the video data, the voice data acquired by the first microphone 210.

The on-vehicle recording control apparatus 100 determines whether an event has been detected by the event detecting unit 129 (Step S102). More specifically, if an event has been detected by the event detecting unit 129 (Yes at Step S102), the on-vehicle recording control apparatus 100 proceeds to Step S103. If an event has not been detected by the event detecting unit 129 (No at Step S102), the on-vehicle recording control apparatus 100 proceeds to Step S107.

If an event has been detected (Yes at Step S102), the on-vehicle recording control apparatus 100 determines whether the vehicle is stopped within a predetermined time period after the event is detected (Step S103). The predetermined time period mentioned here is, for example, 60 seconds or the like. More specifically, if the on-vehicle recording control apparatus 100 determines, by using the stop detecting unit 131, that the vehicle is stopped (Yes at Step S103), the on-vehicle recording control apparatus 100 proceeds to Step S104. In such a case, for example, the vehicle may possibly be stopped in order to check the circumstances or to talk with a person concerned due to the occurrence of an event, such as a collision. If the on-vehicle recording control apparatus 100 does not determine, by using the stop detecting unit 131, that the vehicle is not stopped (No at Step S103), the on-vehicle recording control apparatus 100 proceeds to Step S106.

If it is determined that the vehicle is stopped (Yes at Step S103), the on-vehicle recording control apparatus 100 stores the first event recording data until the period of time for which the vehicle is stopped (Step S104). More specifically, the on-vehicle recording control apparatus 100 generates, by using the video data processing unit 123 from the loop recording video data recorded in the recording unit 230, video data in a time period between the occurrence of the event and the stop of the vehicle as the first event recording data. The on-vehicle recording control apparatus 100 records and stores, by using the recording control unit 124, the first event recording data in the recording unit 230. The on-vehicle recording control apparatus 100 proceeds to Step S105.

The on-vehicle recording control apparatus 100 stores, by using the recording control unit 124, the second event recording data until the predetermined time period has elapsed after the stop of the vehicle (Step S105). More specifically, the second event recording data based on the video data and the outside-vehicle-cabin voice data during the predetermined time period after the stop of the vehicle is recorded in the recording unit 230 by the recording control unit 124. Furthermore, in addition to the video data and the outside-vehicle-cabin voice data during the predetermined time period after the stop of the vehicle, the second event recording data based on the inside-vehicle-cabin voice data may also be recorded in the recording unit 230 by the recording control unit 124. Consequently, an inappropriate response given by the passenger of the other vehicle who is the person concerned or an explanation provided at the time of the occurrence of the event by the person concerned of the other vehicle is recorded in the voice data. The on-vehicle recording control apparatus 100 proceeds to Step S107.

If it is not determined that the vehicle is stopped (No at Step S103), the on-vehicle recording control apparatus 100 stores, by using the recording control unit 124, the first event recording data until the predetermined time period has elapsed (Step S106). More specifically, the on-vehicle recording control apparatus 100 generates, from the loop recording video data recorded in the recording unit 230 by the video data processing unit 123, the video data until the predetermined time period has elapsed from a time point of the occurrence of the event as the first event recording data. The on-vehicle recording control apparatus 100 records and stores, by using the recording control unit 124, the first event recording data in the recording unit 230. The on-vehicle recording control apparatus 100 proceeds to Step S107.

The on-vehicle recording control apparatus 100 determines whether the event detection and the loop recording are to be ended (Step S107). More specifically, if the end operation information is output by the operation control unit 126, the on-vehicle recording control apparatus 100 determines to end the event detection and the loop recording (Yes at Step S107), and ends the process flow. If the end operation information is not output by the operation control unit 126, the on-vehicle recording control apparatus 100 determines not to end the event detection and the loop recording (No at Step S107), and again performs the process at Step S102.

In this way, if the event is detected, the first event recording data is stored, and, if a stop of the vehicle is detected after the event is detected, the second event recording data based on the video data and the outside-vehicle-cabin voice data is stored.

As described above, in the embodiment, it is possible to store, if the event is detected, the first event recording data and it is possible to store, if a stop of the vehicle after the event is detected, the second event recording data based on the video data and the outside-vehicle-cabin voice data. According to the embodiment, it is possible to record, by the voice data as the second event recording data, an inappropriate response given by a passenger of the other vehicle who is a person concerned at the time of the occurrence of the event detection or an explanation provided by the person concerned of the other vehicle at the time of the occurrence of the event.

In the embodiment, in addition to the video data and the outside-vehicle-cabin voice data until the predetermined time period has elapsed after the stop of the vehicle, it is possible to record the second event recording data based on the inside-vehicle-cabin voice data. According to the embodiment, it is possible to acquire a voice outside the vehicle cabin that can be acquired inside the vehicle cabin even when outside-vehicle-cabin voice data has large noise. According to the embodiment, for example, if a driver of the vehicle steps outside of the vehicle in order to respond to the person concerned, it is possible to objectively judge the circumstances at the time of the event detection from the voice of the other passenger staying inside the vehicle cabin.

In the embodiment, it is possible to selectively output the outside-vehicle-cabin voice data and the inside-vehicle-cabin voice data regarding the event recording data that includes the outside-vehicle-cabin voice data and the inside-vehicle-cabin voice data. According to the embodiment, it is possible to replay and confirm appropriate voice data.

In this way, according to the embodiment, it is possible to appropriately record, together with voices, the circumstances outside the vehicle cabin after the event.

Second Embodiment

Figure 3:
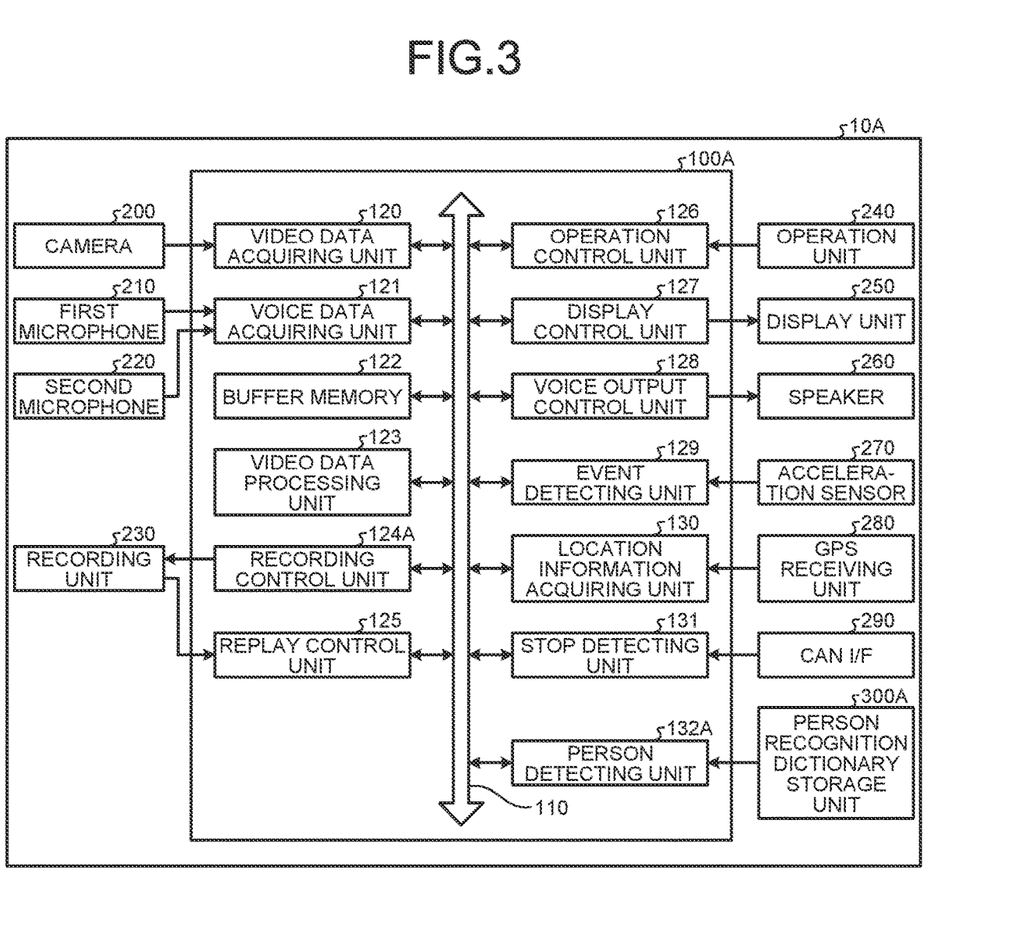
FIG. 3 is a block diagram illustrating a configuration example of an on-vehicle recording apparatus according to a second embodiment.
Figure 4:
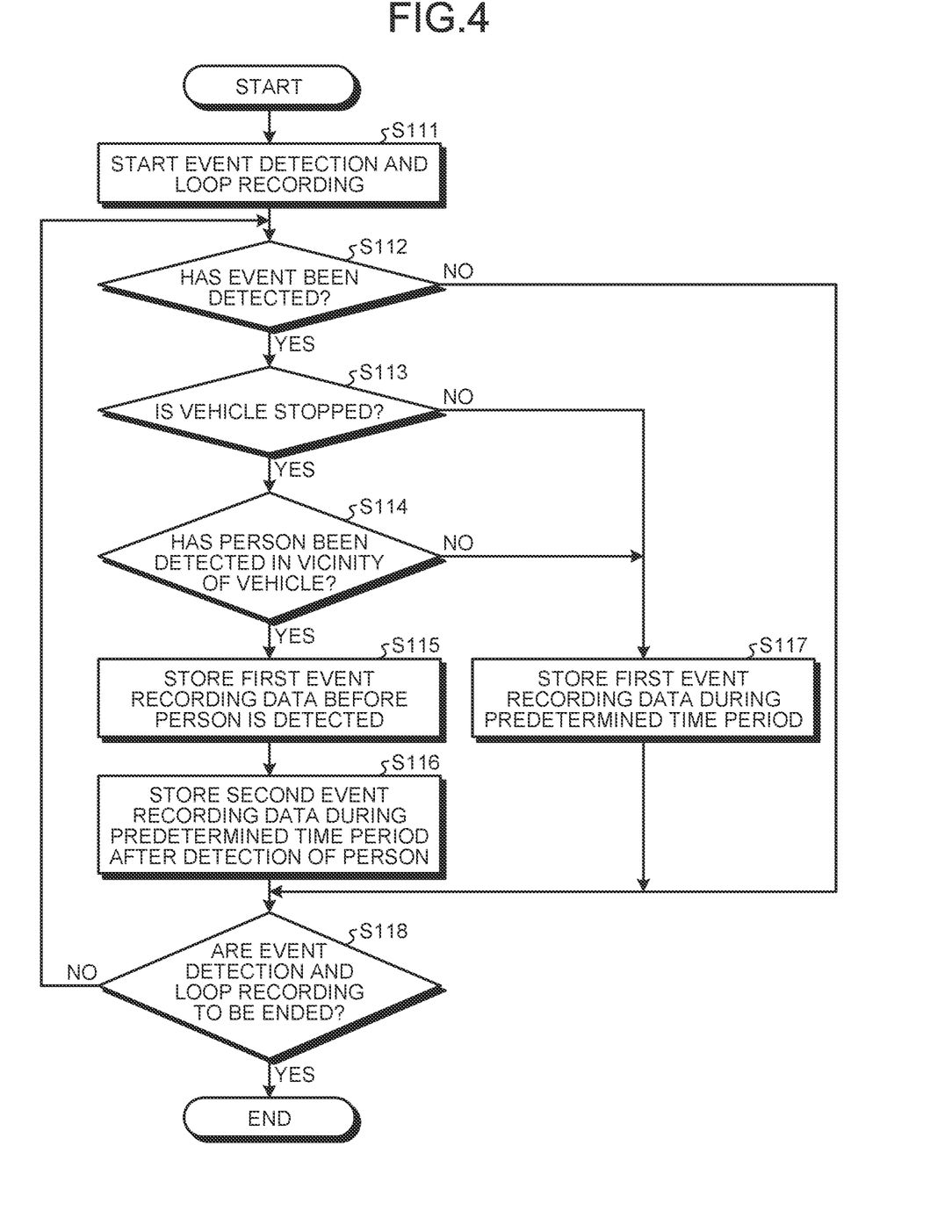
FIG. 4 is a flowchart illustrating an example of the flow of a process performed in the on-vehicle recording control apparatus according to the second embodiment.
Figure 5:
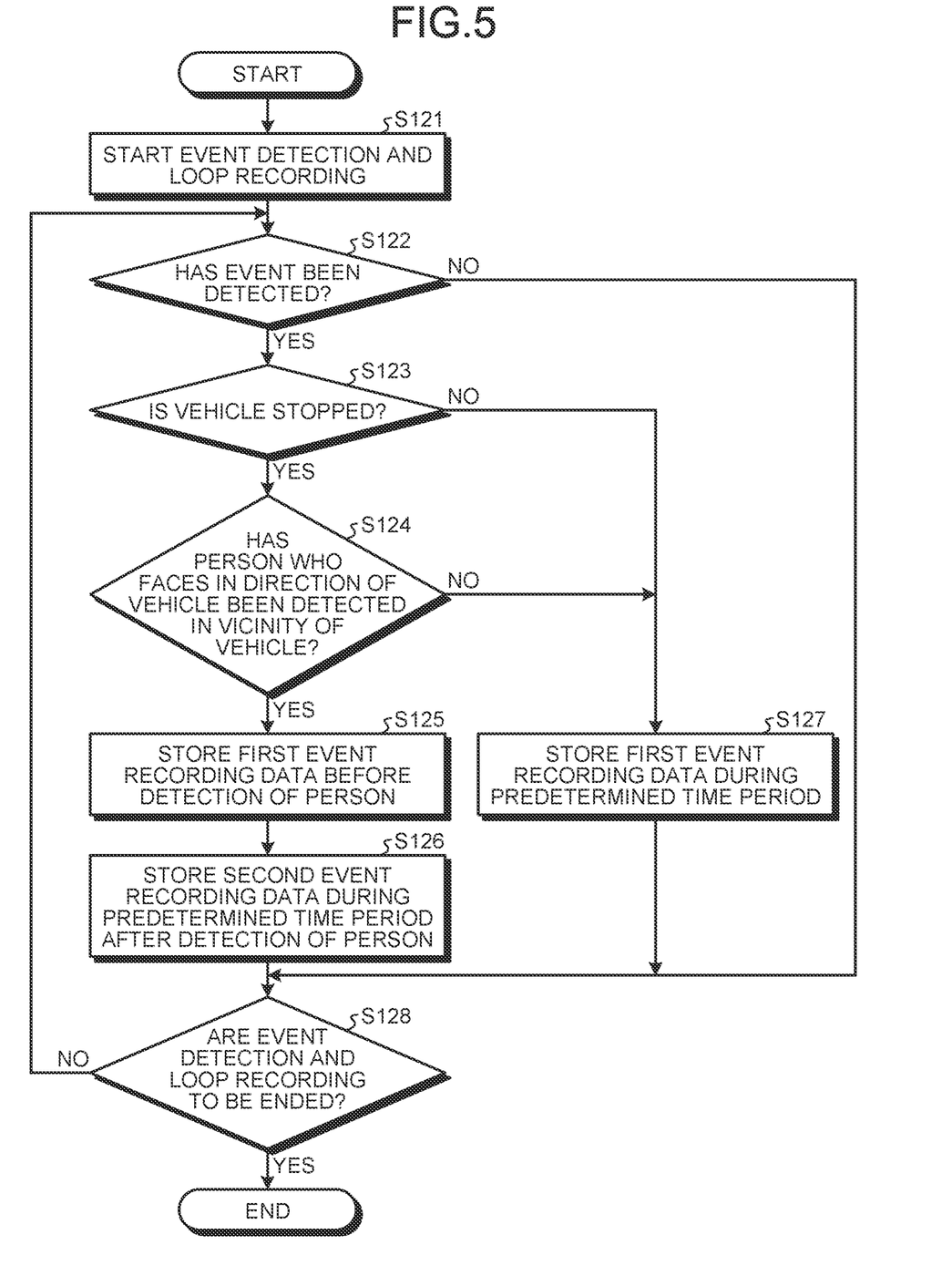
FIG. 5 is a flowchart illustrating an example of the flow of a process performed in the on-vehicle recording control apparatus according to the second embodiment.
Figure 6:
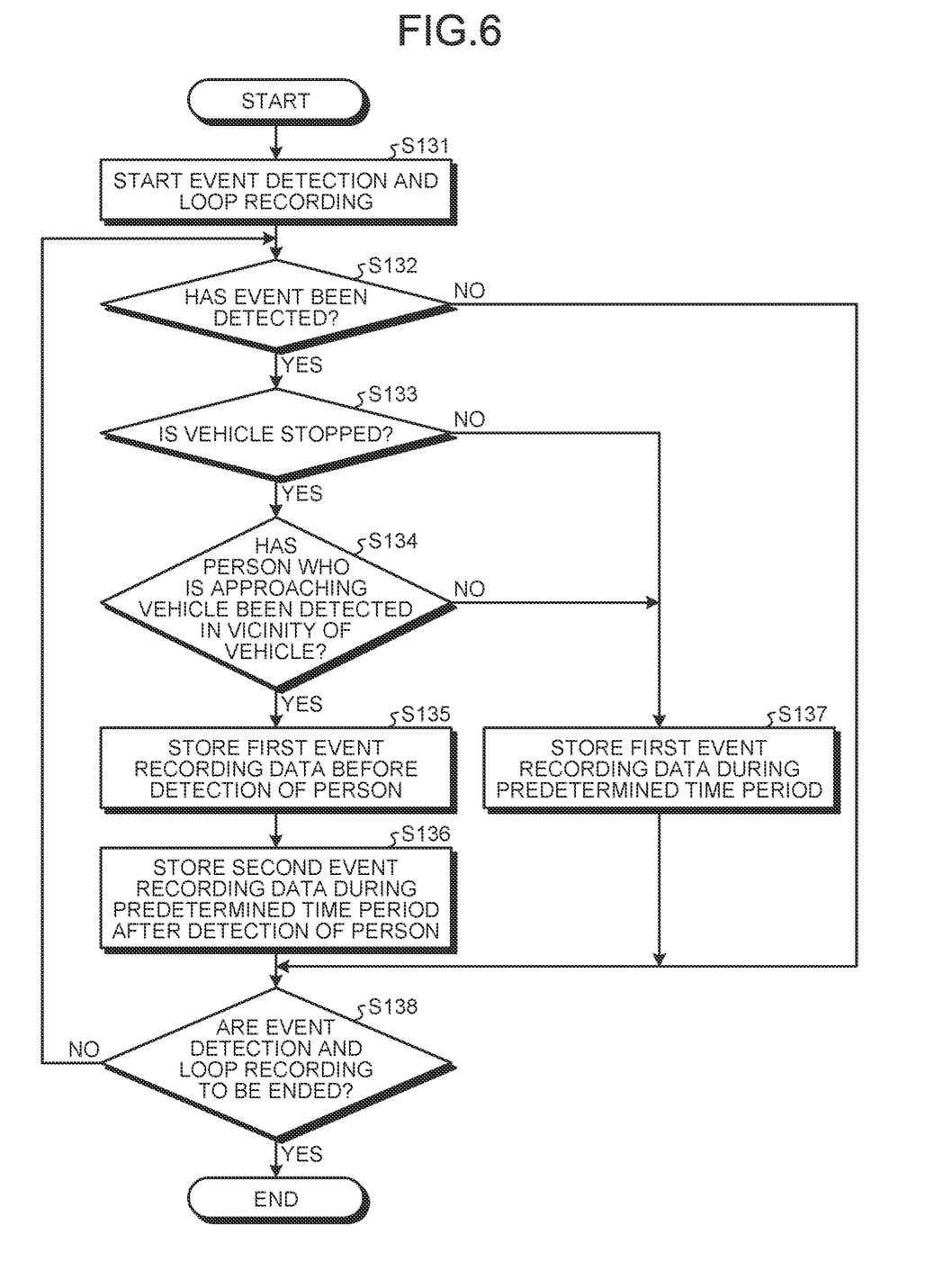
FIG. 6 is a flowchart illustrating an example of the flow of a process performed in the on-vehicle recording control apparatus according to the second embodiment.

An on-vehicle recording apparatus 10A according to an embodiment will be described with reference to FIG. 3 to FIG. 6. FIG. 3 is a block diagram illustrating a configuration example of an on-vehicle recording apparatus according to a second embodiment. FIG. 4 is a flowchart illustrating an example of the flow of a process performed in the on-vehicle recording control apparatus according to the second embodiment. FIG. 5 is a flowchart illustrating an example of the flow of a process performed in the on-vehicle recording control apparatus according to the second embodiment. FIG. 6 is a flowchart illustrating an example of the flow of a process performed in the on-vehicle recording control apparatus according to the second embodiment. The basic configuration of the on-vehicle recording apparatus 10A is the same as that of the on-vehicle recording apparatus 10 according to the first embodiment. In a description below, components having the same function as those of the on-vehicle recording apparatus 10 are assigned the same or the associated reference numerals and descriptions thereof in detail will be omitted. The on-vehicle recording apparatus 10A is different from the first embodiment in that a person recognition dictionary storage unit 300A and a person detecting unit 132A are included, and different in a process performed in a recording control unit 124A.

The person recognition dictionary storage unit 300A stores therein recognition dictionary data capable of checking patterns of, for example, a shape, a size, and a color of a person viewed from the front. The person recognition dictionary storage unit 300A is, for example, a semiconductor memory device, such as a RAM, a ROM, and a flash memory, or a storage device, such as a hard disk, an optical disk, and an external storage device connected via a network.

The person detecting unit 132A detects, from the video data, a person in the vicinity of the vehicle. The person detecting unit 132A performs a person recognition process on the video data, and then, detects a person. More specifically, the person detecting unit 132A performs pattern matching on the video data using the recognition dictionary data stored in the person recognition dictionary storage unit 300A, and then, detects the presence of the person. The person detecting unit 132A follows the detected person by performing image processing. The recognition method of the person performed by the person detecting unit 132A is not limited to this and a known method may be used.

The person detecting unit 132A may also detect, from the video data, a person who faces in the direction of the vehicle in the vicinity of the vehicle. Consequently, it is possible to prevent a passerby or the like passing by the vicinity of the vehicle from being carelessly detected.

The person detecting unit 132A may also detect a state in which a person in the vicinity of the vehicle is approaching the vehicle. Consequently, it is possible to prevent a person or the like passing the vicinity of the vehicle from being carelessly detected.

If the person detecting unit 132A detects a person who is in the vicinity of the vehicle after the stop detecting unit 131 detects a stop of the vehicle within the predetermined time period after the event detecting unit 129 detects the event, the recording control unit 124A stores the second event recording data based on the video data and the outside-vehicle-cabin voice data.

If the person detecting unit 132A detects a person who faces in the direction of the vehicle in the vicinity of the vehicle after the stop detecting unit 131 detects the stop of the vehicle within the predetermined time period after the event detecting unit 129 detects the event, the recording control unit 124A may also store the second event recording data based on the video data and the outside-vehicle-cabin voice data.

If the person detecting unit 132A detects a person who is approaching the vehicle in the vicinity of the vehicle after the stop detecting unit 131 detects the stop of the vehicle within the predetermined time period after the event detecting unit 129 detects the event, the recording control unit 124A may also store the second event recording data based on the video data and the outside-vehicle-cabin voice data.

In the following, the flow of a process performed in an on-vehicle recording control apparatus 100A will be described with reference to FIG. 4. The processes at Step S111 to Step S113, Step S117, and Step S118 are the same as the processes at Step S101 to Step S103, Step S106, and Step S107 indicated by the flowchart illustrated in FIG. 2.

The on-vehicle recording control apparatus 100A determines, by using the person detecting unit 132A, whether a person who is in the vicinity of the vehicle has been detected (Step S114). More specifically, if a person in the vicinity of the vehicle is detected by the person detecting unit 132A (Yes at Step S114), the on-vehicle recording control apparatus 100A proceeds to Step S115. If a person in the vicinity of the vehicle is not detected by the person detecting unit 132A (No at Step S114), the on-vehicle recording control apparatus 100A proceeds to Step S117.

If a person in the vicinity of the vehicle is detected (Yes at Step S114), the on-vehicle recording control apparatus 100A stores the first event recording data up to the time point of the detection of the person (Step S115). More specifically, the on-vehicle recording control apparatus 100A generates, from the loop recording video data recorded in the recording unit 230 by using the video data processing unit 123, the video data during the time period between the occurrence time of the event and the detection of the person as the first event recording data. The on-vehicle recording control apparatus 100A records and stores, by using the recording control unit 124A, the first event recording data in the recording unit 230. The on-vehicle recording control apparatus 100A proceeds to Step S116.

The on-vehicle recording control apparatus 100A stores, by using the recording control unit 124A, the second event recording data until the predetermined time period has elapsed after the stop of the vehicle (Step S116). More specifically, the second event recording data based on the video data and the outside-vehicle-cabin voice data until the predetermined time period has elapsed from a time point of the detection of the person is recorded in the recording unit 230 by the recording control unit 124A. Furthermore, in addition to the video data and the outside-vehicle-cabin voice data until the predetermined time period has elapsed from a time point of the detection of the person, the second event recording data based on the inside-vehicle-cabin voice data may also be stored in the recording unit 230 by the recording control unit 124A. The on-vehicle recording control apparatus 100A proceeds to Step S118.

In the following, another example of the flow of a process performed in the on-vehicle recording control apparatus 100A will be described with reference to FIG. 5. Instead of the process at Step S114, a process at Step S124 is performed.

The on-vehicle recording control apparatus 100A determines, by using the person detecting unit 132A, whether a person who faces in the direction of the vehicle is detected in the vicinity of the vehicle (Step S124). More specifically, if a person who faces in the direction of the vehicle is detected in the vicinity of the vehicle by the person detecting unit 132A (Yes at Step S124), the on-vehicle recording control apparatus 100A proceeds to Step S125. If a person who faces in the direction of the vehicle is not detected in the vicinity of the vehicle by the person detecting unit 132A (No at Step S124), the on-vehicle recording control apparatus 100A proceeds to Step S127.

In the following, another example of the follow of a process performed in the on-vehicle recording control apparatus 100A will be described with reference to FIG. 6. Instead of the process at Step S114, a process at Step S134 is performed.

The on-vehicle recording control apparatus 100A determines, by using the person detecting unit 132A, whether a person who is approaching the vehicle is detected in the vicinity of the vehicle (Step S134). More specifically, if a person who is approaching the vehicle is detected in the vicinity of the vehicle by the person detecting unit 132A (Yes at Step S134), the on-vehicle recording control apparatus 100A proceeds to Step S135. If a person who is approaching the vehicle is not detected in the vicinity of the vehicle by the person detecting unit 132A (No at Step S134), the on-vehicle recording control apparatus 100A proceeds to Step S137.

In this way, if a person who is in the vicinity of the vehicle is detected after the stop of the vehicle is detected within the predetermined time period after the detection of the event, the second event recording data based on the video data and the outside-vehicle-cabin voice data is stored. Alternatively, if a person who is in the vicinity of the vehicle and faces in the direction of the vehicle is detected after the stop of the vehicle is detected within the predetermined time period after the detection of the event, the second event recording data based on the video data and the outside-vehicle-cabin voice data may be stored. Still alternatively, if a person who is in the vicinity of the vehicle and is approaching the vehicle is detected after the stop of the vehicle is detected within the predetermined time period after the detection of the event, the second event recording data based on the video data and the outside-vehicle-cabin voice data may be stored.

As described above, in the embodiment, if a person in the vicinity of the vehicle is detected after the stop of the vehicle is detected within the predetermined time period after detection of the event, it is possible to store the second event recording data based on the video data and the outside-vehicle-cabin voice data. Alternatively, in the embodiment, if a person who faces in the direction of the vehicle is detected in the vicinity of the vehicle after the stop of the vehicle is detected within a predetermined time period after the detection of the event, it is possible to store the second event recording data based on the video data and the outside-vehicle-cabin voice data. Still alternatively, in the embodiment, if a person who is approaching the vehicle is detected in the vicinity of the vehicle after a stop of the vehicle is detected within the predetermined time period after the detection of the event, it is possible to store the second event recording data based on the video data and the outside-vehicle-cabin voice data.

In the embodiment, a person who faces in the direction of the vehicle is detected in the vicinity of the vehicle; therefore, it is possible to prevent a passerby or the like passing by the vicinity of the vehicle from being carelessly detected.

In the embodiment, a state in which a person in the vicinity of the vehicle is approaching the vehicle is detected; therefore, it is possible to prevent a person or the like passing the vicinity of the vehicle from being carelessly detected.

Third Embodiment

Figure 7:
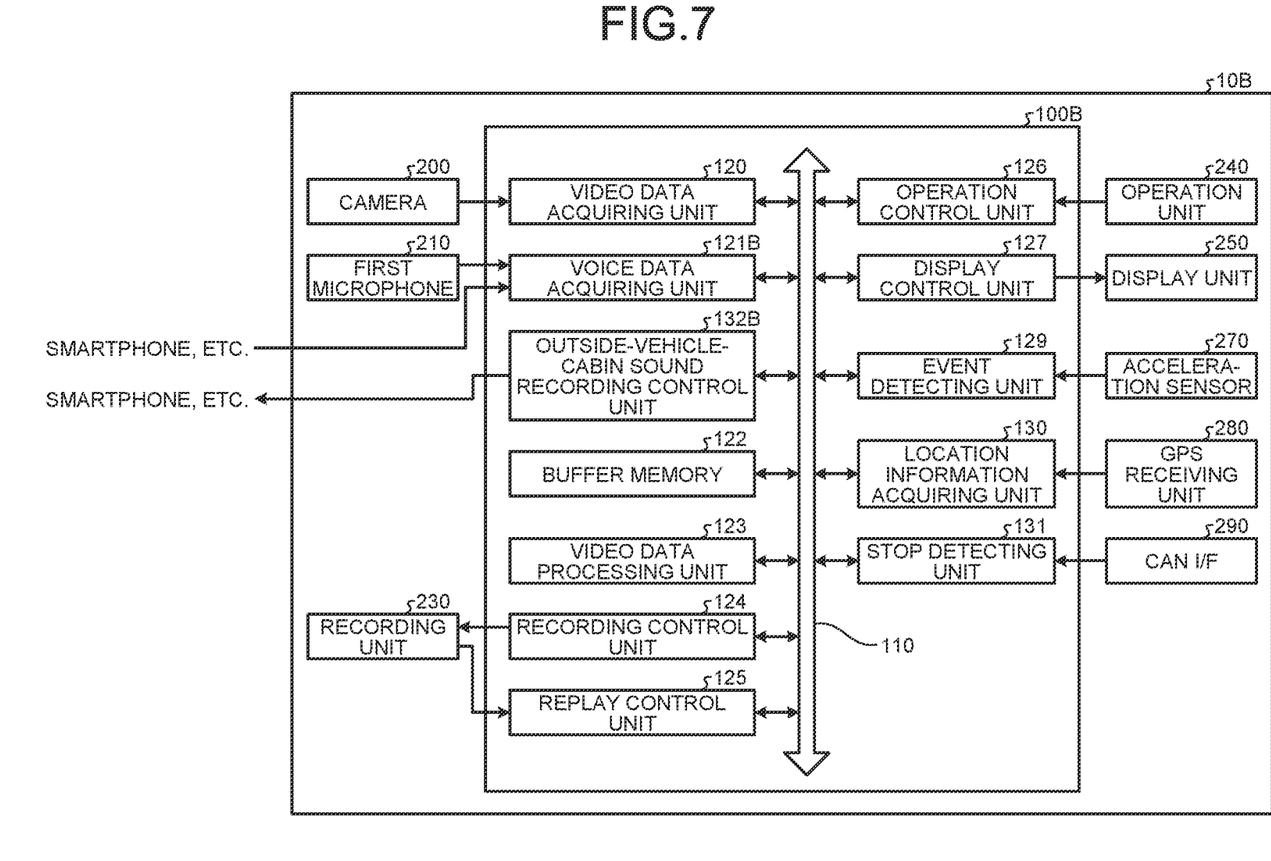
FIG. 7 is a block diagram illustrating a configuration example of an on-vehicle recording apparatus according to a third embodiment.

An on-vehicle recording apparatus 10B according to an embodiment will be described with reference to FIG. 7. FIG. 7 is a block diagram illustrating a configuration example of an on-vehicle recording apparatus according to a third embodiment. The basic configuration of the on-vehicle recording apparatus 10B is the same as that of the on-vehicle recording apparatus 10 according to the first embodiment. In a description below, components having the same function as those of the on-vehicle recording apparatus 10 are assigned the same or the associated reference numerals and descriptions thereof in detail will be omitted. The on-vehicle recording apparatus 10B is different from the first embodiment in that the second microphone 220, the voice output control unit 128, and the speaker 260 are not included and an outside-vehicle-cabin voice recording control unit 132B is included. The on-vehicle recording apparatus 10B is used by a passenger of a vehicle via a communication unit (not illustrated) and is capable of wirelessly sending and receiving data to and from a portable electronic device that includes a voice collecting unit.

A voice data acquiring unit 121B acquires voice data collected by a voice collecting unit included in an electronic device, such as a smartphone, carried by a passenger of the vehicle.

The outside-vehicle-cabin voice recording control unit 132B controls the voice collecting unit included in the electronic device carried by the passenger of the vehicle and outputs a control signal for causing the voice collecting unit included in the electronic device to start or stop acquiring a voice in a surrounding area.

In this way, voice data collected by the voice collecting unit included in the electronic device, such as a smartphone, carried by the passenger of the vehicle is acquired.

As described above, in the embodiment, it is possible to acquire, via the outside-vehicle-cabin voice recording control unit 132B, the voice data collected by the voice collecting unit included in the electronic device, such as a smartphone, carried by a passenger of a vehicle. Consequently, in the embodiment, by overwriting a program of the on-vehicle recording apparatus 10, it is possible to easily apply the embodiment to the on-vehicle recording apparatus 10.

The on-vehicle recording apparatus 10 according to the embodiment may also be implemented with various kinds of embodiments other than the embodiments described above.

Each of the components included in the on-vehicle recording apparatus 10 illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

The configuration of the on-vehicle recording apparatus 10 is implemented as, for example, software, programs, or the like loaded in a memory. In the embodiments described above, the description has been given as the functional blocks that are implemented in cooperation with these pieces of hardware or software. In other words, the functional blocks can be implemented in various forms by using only hardware, using only software, or using a combination of hardware and software.

The components described above include one that can easily be thought of by a person skilled in the art and one that is practically identical. Further, the configurations described above may be combined appropriately. Furthermore, various omissions, replacements, and modifications of the components may be made within the scope of the present embodiments.

Furthermore, it is preferable to record voice data that has been subjected to noise cancellation in the recording unit 230 after having performed signal processing on the voice data acquired by the voice data acquiring unit 121 and then performing a noise cancellation process that cancels out unwanted noise in a surrounding area.

According to an aspect of an embodiment, it is possible to appropriately record, including a voice, circumstances of outside the vehicle cabin after the event.

What is claimed is:

1. An on-vehicle recording control apparatus comprising:
a video data acquiring unit configured to acquire video data captured by an image capturing unit that captures surroundings of a vehicle;
a voice data acquiring unit configured to acquire outside-vehicle-cabin voice data from an outside-vehicle-cabin voice collecting unit that acquires a voice outside a vehicle cabin of the vehicle;
an event detecting unit configured to detect an event for the vehicle;
a stop detecting unit configured to detect a stop of the vehicle;
a person detecting unit configured to detect a person in a vicinity of the vehicle from the video data acquired by the video data acquiring unit; and
a recording control unit configured to store, when the event detecting unit detects the event, first event recording data based on the video data and to store, when the person detecting unit detects the person in the vicinity of the vehicle after the stop detecting unit detects the stop of the vehicle within a predetermined time period after the event detecting unit detects the event, second event recording data based on the video data and the outside-vehicle-cabin voice data until a predetermined time period has elapsed after the person is detected.

2. The on-vehicle recording control apparatus according to claim 1, wherein
the person detecting unit detects a person who faces in a direction of the vehicle in the vicinity of the vehicle from the video data acquired by the video data acquiring unit, and
when the stop detecting unit detects the stop of the vehicle within the predetermined time period after the event detecting unit detects the event and when the person detecting unit detects the person who faces in the direction of the vehicle in the vicinity of the vehicle, the recording control unit stores the second event recording data based on the video data and the outside-vehicle-cabin voice data.

3. The on-vehicle recording control apparatus according to claim 1, wherein
the person detecting unit detects a state in which the person in the vicinity of the vehicle is approaching the vehicle, and
when the stop detecting unit detects the stop of the vehicle within the predetermined time period after the event detecting unit detects the event and when the person detecting unit detects the person who is approaching the vehicle in the vicinity of the vehicle, the recording control unit stores the second event recording data based on the video data and the outside-vehicle-cabin voice data.

4. The on-vehicle recording control apparatus according to claim 1, wherein
the voice data acquiring unit acquires inside-vehicle-cabin voice data from an inside-vehicle-cabin voice collecting unit that acquires a voice inside the vehicle cabin of the vehicle, and
the recording control unit stores the second event recording data based on the inside-vehicle-cabin voice data in addition to the video data and the outside-vehicle-cabin voice data.

5. The on-vehicle recording control apparatus according to claim 4, further comprising a replay control unit configured to replay the first event recording data and the second event recording data that are event recording data stored by the recording control unit, wherein
the replay control unit replays, regarding the event recording data including the outside-vehicle-cabin voice data and the inside-vehicle-cabin voice data, the outside-vehicle-cabin voice data and the inside-vehicle-cabin voice data so as to be selectively output.

6. An on-vehicle recording apparatus comprising:
an on-vehicle recording control apparatus according to claim 1, and
at least one of the image capturing unit that captures the surroundings of the vehicle, the outside-vehicle-cabin voice collecting unit that acquires the voice outside of the vehicle cabin of the vehicle, and a recording unit that stores therein the first event recording data and the second event recording data.

7. An on-vehicle recording control method comprising:
acquiring video data captured by an image capturing unit that captures surroundings of a vehicle;
acquiring outside-vehicle-cabin voice data from an outside-vehicle-cabin voice collecting unit that acquires a voice outside a vehicle cabin of the vehicle;
detecting an event for the vehicle;
storing first event recording data based on the video data when the event is detected;
detecting a stop of the vehicle;
detecting a person in a vicinity of the vehicle from the video data acquired; and
storing, when the person in the vicinity of the vehicle is detected after the stop of the vehicle is detected within a predetermined time period after the event is detected, second event recording data based on the video data and the outside-vehicle-cabin voice data until a predetermined time period has elapsed after the person is detected.

8. A non-transitory computer-readable recording medium containing a computer program that causes a computer, which functions as an on-vehicle recording control apparatus, to execute:
acquiring video data captured by an image capturing unit that captures surroundings of a vehicle;
acquiring outside-vehicle-cabin voice data from an outside-vehicle-cabin voice collecting unit that acquires a voice outside a vehicle cabin of the vehicle;
detecting an event for the vehicle;
storing first event recording data based on the video data when the event is detected;
detecting a stop of the vehicle;
detecting a person in a vicinity of the vehicle from the video data acquired; and
storing, when the person in the vicinity of the vehicle is detected after the stop of the vehicle is detected within a predetermined time period after the event is detected, second event recording data based on the video data and the outside-vehicle-cabin voice data until a predetermined time period has elapsed after the person is detected.

* * * * *